No. 729,788. PATENTED JUNE 2, 1903.
E. G. NELSON.
LIQUID HOLDER.
APPLICATION FILED OCT. 23, 1902.
NO MODEL.
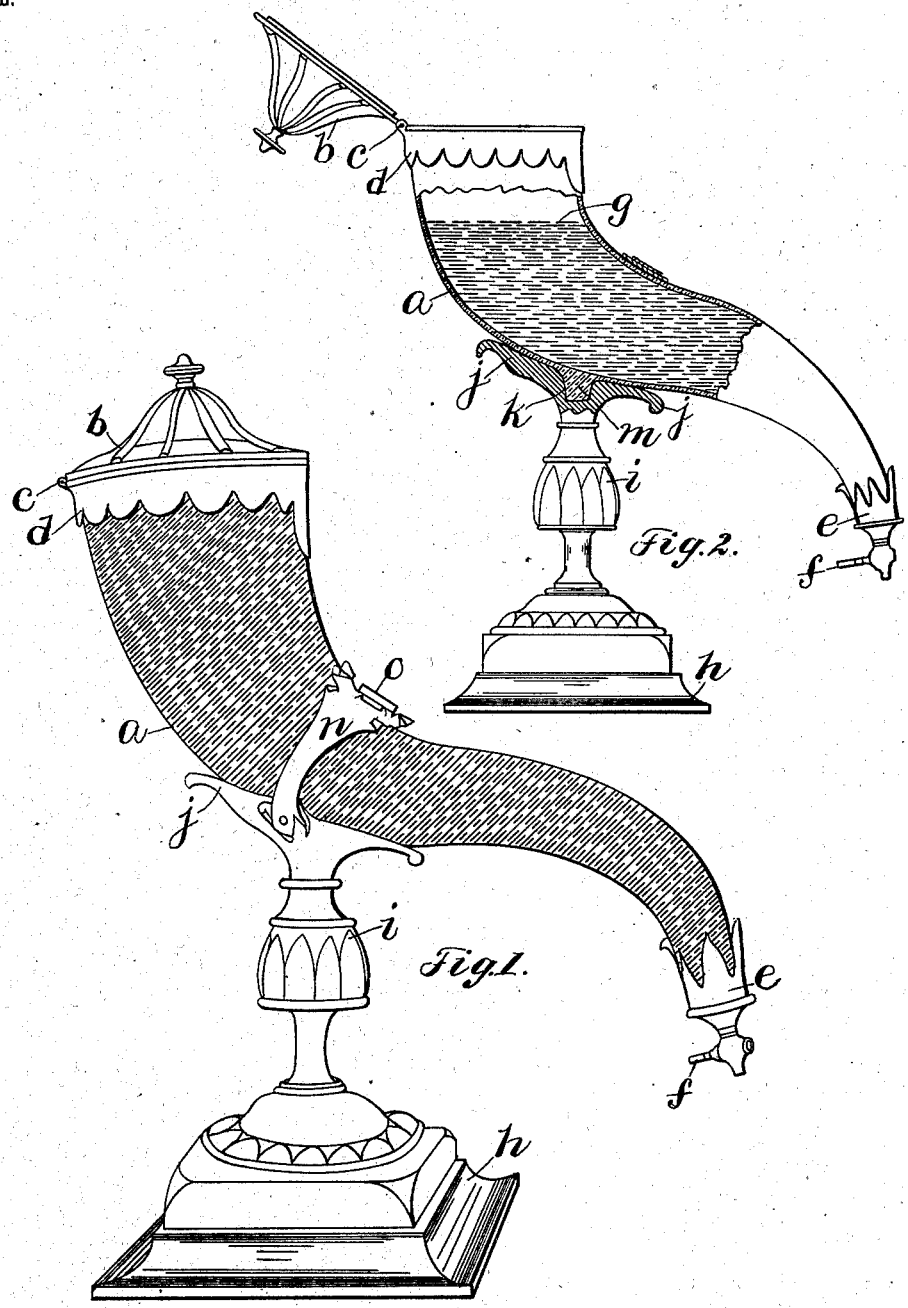
Witnesses.
C. H. Garnett
J. Murphy.
Inventor:
Eskil G. Nelson
by Jas. H. Churchill
Atty.

No. 729,788. Patented June 2, 1903.

UNITED STATES PATENT OFFICE.

ESKIL G. NELSON, OF CAMBRIDGE, MASSACHUSETTS.

LIQUID-HOLDER.

SPECIFICATION forming part of Letters Patent No. 729,788, dated June 2, 1903.

Application filed October 23, 1902. Serial No. 128,425. (No model.)

*To all whom it may concern:*

Be it known that I, ESKIL G. NELSON, a citizen of the United States, residing in Cambridge, in the county of Middlesex and State of Massachusetts, have invented an Improvement in Liquid-Holders, of which the following description, in connection with the accompanying drawings, is a specification, like letters on the drawings representing like parts.

This invention relates to a novel holder for liquids especially designed and adapted for use on sideboards, tables, dressers, &c., for holding water, wine, colognes, or other liquid.

The invention has for its object to provide a device or apparatus for the purpose specified which shall be useful and also ornamental. For this purpose I employ a receptacle for the liquid which is made in substantially the form of a horn and is provided with a cover for its inlet and with a nozzle for its outlet, which nozzle is provided with a suitable valve for controlling the flow of liquid out of the horn. The horn is supported upon a pedestal or upright, and in order to firmly secure the horn to its pedesdal or support means are provided, as will be described, for preventing both longitudinal and lateral displacement of the horn on its support. These and other features of this invention will be pointed out in the claims at the end of this specification.

Figure 1 is a side elevation of a liquid-holding device embodying this invention, and Fig. 2 a partial section and elevation of the device shown in Fig. 1 with the cover open.

Referring to the drawings, *a* represents a receptacle for liquid, which may be water, wine, cologne, &c. The receptacle *a* may and preferably will be made of glass and in the form of a curved horn provided at its upper end with a cover *b*, which may and preferably will be hinged at *c* to a metal or other band *d* on the wide upper portion of the horn.

The horn-shaped receptacle *a* is provided at its lower end with a fitting or nozzle *e*, which may be of metal and is provided with a valve *f*, controlling the discharge of the liquid *g* from the horn-shaped receptacle *a*. The receptacle *a* is provided with a support of sufficient height to elevate the discharge-nozzle of the receptacle above the table, sideboard, or other surface upon which the device is placed.

The support referred to may and preferably will be made as herein shown and consists of a base *h* and an upright or standard *i*, having at its upper end an enlargement or flange *j*, provided with a curved upper surface to conform to the curved form of the bottom of the receptacle, the said upright being also provided with a socket *k*, into which is extended a projection *m* on the bottom or under side of the receptacle *a*, as clearly shown in Fig. 2. The projection *m* serves to lock the receptacle to the support or stand *i* against accidental disengagement laterally, and to prevent disengagement of the projection *m* from its socket by a tilting longitudinal movement of the receptacle I have provided means for this purpose.

In the present instance the standard *i* has secured to its opposite sides two straps or pieces *n o*, which may be of metal or other suitable material and which, as herein represented, are passed up over the upper surface of the substantially central portion of the receptacle and joined together in any suitable manner, and, as herein represented, a tongue on one piece enters a slot in the other; but I do not desire to limit my invention to the particular form of means herein shown for encircling the receptacle transversely and securing the same on its standard or support against tilting longitudinal displacement.

The device or apparatus herein shown constitutes a neat and attractive means for holding liquids of all kind and is particularly serviceable for holding water, wine, cologne, &c.

I may prefer to make the receptacle *a* of glass; but I do not desire to limit my invention in this respect.

I claim—

1. The combination with a horn-shaped receptacle provided with a cover for its inlet-mouth and with a nozzle for its outlet end, said nozzle having a valve to control the discharge of liquid out of the said receptacle, of a standard or upright to support the said receptacle, substantially as described.

2. The combination with a horn-shaped receptacle provided on its under side with a lug or projection, of a standard or upright for supporting said receptacle and provided in its upper surface with a socket for the reception of the lug or projection on the under side of the receptacle, substantially as described.

3. The combination with a horn-shaped receptacle provided on its under side with a lug or projection, of a standard or upright for supporting said receptacle and provided in its upper surface with a socket for the reception of the lug or projection on the under side of the receptacle, and means attached to the said standard and encircling the said receptacle, substantially as described.

4. The combination with a horn-shaped receptable provided with a cover for its upper end or mouth and with a fitting or nozzle for its lower end, said fitting having a valve to control the discharge of liquid out of the said receptacle, and a lug or projection on the under side of said receptacle, of a standard or upright provided with a curved upper surface having a socket for the reception of said lug or projection, and means encircling the receptacle for securing it to the standard or upright, substantially as described.

5. The combination with a horn-shaped receptacle, a band fitted to its upper end, and a cover hinged to said band, of a fitting or nozzle secured to the lower end of said receptacle and provided with a valve to control the discharge of liquid from said receptacle, substantially as described.

In testimony whereof I have signed my name to this specification in the presence of two subscribing witnesses.

ESKIL G. NELSON.

Witnesses:
JAS. H. CHURCHILL,
J. MURPHY.